(12) United States Patent
Roy et al.

(10) Patent No.: US 11,630,934 B1
(45) Date of Patent: Apr. 18, 2023

(54) INTEGRATED CIRCUIT ANALYSIS USING A MULTI-LEVEL DATA HIERARCHY IMPLEMENTED ON A DISTRIBUTED COMPUTE AND DATA INFRASTRUCTURE

(71) Applicant: Synopsys, Inc., Mountain View, CA (US)

(72) Inventors: Jayanta Roy, San Jose, CA (US); Ajay Singh Bisht, San Jose, CA (US); Mark William Brown, Little Elm, TX (US); Arney Deshpande, Sunnyvale, CA (US); Yibing Wang, Santa Clara, CA (US); Ramakrishnan Balasubramanian, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 13 days.

(21) Appl. No.: 17/175,268

(22) Filed: Feb. 12, 2021

Related U.S. Application Data

(60) Provisional application No. 62/976,874, filed on Feb. 14, 2020.

(51) Int. Cl.
*G06F 30/30* (2020.01)
*G06F 30/3308* (2020.01)
*G06F 9/54* (2006.01)
*G06F 111/02* (2020.01)

(52) U.S. Cl.
CPC .......... *G06F 30/3308* (2020.01); *G06F 9/547* (2013.01); *G06F 2111/02* (2020.01)

(58) Field of Classification Search
CPC ... G06F 30/3308; G06F 9/547; G06F 2111/02
USPC .......................................................... 716/100
See application file for complete search history.

(56) References Cited

U.S. PATENT DOCUMENTS

| | | | |
|---|---|---|---|
| 6,249,903 B1 * | 6/2001 | McSherry ............. | G06F 30/398 716/136 |
| 8,185,854 B1 * | 5/2012 | Hutton ................ | G06F 30/3312 716/108 |
| 8,732,651 B1 * | 5/2014 | Kukal .................... | G06F 30/30 716/132 |
| 11,238,199 B1 * | 2/2022 | Isoard .................. | G06F 30/327 |

* cited by examiner

*Primary Examiner* — Jack Chiang
*Assistant Examiner* — Brandon Bowers
(74) *Attorney, Agent, or Firm* — Park, Vaughan, Fleming & Dowler LLP; Laxman Sahasrabuddhe (57) ABSTRACT

Systems and methods for integrated circuit (IC) analysis using a multi-level data hierarchy implemented on a distributed compute and data infrastructure are described. An IC design may be represented using a set of storage areas, where each storage area may be stored in a contiguous block of storage and may correspond to a portion of the IC design. An analysis application may be executed on the IC design, where a subset of the set of storage areas that is used by the analysis application may be retrieved on-demand.

17 Claims, 6 Drawing Sheets

INTEGRATED CIRCUIT ANALYSIS USING A MULTI-LEVEL DATA HIERARCHY IMPLEMENTED ON A DISTRIBUTED COMPUTE AND DATA INFRASTRUCTURE

RELATED APPLICATION

This application claims the benefit of U.S. Provisional Application Ser. No. 62/976,874, filed on 14 Feb. 2020, the contents of which are herein incorporated by reference in their entirety for all purposes.

TECHNICAL FIELD

The present disclosure relates to integrated circuit (IC) analysis. More specifically, the present disclosure relates to IC analysis using a multi-level data hierarchy implemented on a distributed compute and data infrastructure.

BACKGROUND

An increasing demand for computing and storage capacity has fueled an increase in the size and complexity of IC designs. Analyzing large and complex IC designs can be intractable using existing techniques.

SUMMARY

Embodiments described herein feature techniques and systems for IC analysis using a multi-level data hierarchy implemented on a distributed compute and data infrastructure. An IC design may be represented using a set of storage areas, where each storage area may be stored in a contiguous block of storage and correspond to a portion of the IC design. Next, an analysis application may be executed on the IC design, where a subset of the set of storage areas that is used by the analysis application is retrieved on-demand.

In some embodiments, each storage area of the set of storage areas may include a module segment, an instance array, and a net array. The module segment may include a module data area and a port array. The instance array may include one or more instance segments, where each instance segment may include an instance data area and a pin array. The net array may include one or more net segments, where each net segment may include a net data area and a connection array.

In some embodiments, executing the analysis application may include executing a plurality of analysis tasks in parallel using a plurality of compute units. Each compute unit (e.g., a processor core) may include a cache of storage areas.

In some embodiments, the plurality of analysis tasks may access the set of storage areas using a data store application programming interface (API) layer which enables in-memory sharing of storage areas across the plurality of analysis tasks.

In some embodiments, the subset of the set of storage areas may be written to disk or cloud storage when the plurality of analysis tasks completes or a checkpoint is triggered.

In some embodiments, the plurality of analysis tasks may communicate with one another using an asynchronous notification mechanism.

BRIEF DESCRIPTION OF THE FIGURES

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Aspects of the present disclosure relate to IC analysis using a multi-level data hierarchy implemented on a distributed compute and data infrastructure. IC designs are used in a wide range of applications including, but not limited to, automobiles, mobile devices, IOT (internet of things) applications, mobile edge devices, mobile aggregation equipment, network backplanes, baseband modems, and artificial intelligence (AI). It is desirable to analyze the behavior of IC designs across various applications and operating conditions. For example, it may be important to perform an accurate analysis of peak power consumption of the IC design for mission critical, real-time applications.

For large and complex IC designs, e.g., SoC (System on Chip) designs, some techniques perform estimation and root cause analysis by (1) analyzing only a small window of the real use case of the IC design, and/or (2) analyzing only a portion of the IC design. These techniques do not produce accurate results, and may use large amounts of computation, memory, and communication resources. As an example, an IC design with one billion gates may use 100,000 central processing unit (CPU) hours to analyze 20 million cycles at 1% data rate (the term "data rate" may refer to the data toggle rate per clock cycle). An analysis of 1 million clock cycles (instead of 20 million clock cycles) may use 5,000 CPU hours and analyzing a quarter of the IC design (instead of the full IC design) for 1 million clock cycles takes may use 1,250 CPU hours. The size and complexity of AI-based SoC designs is expected to grow rapidly. For example, the number of cores in SoC designs may double within a few years.

Embodiments described herein provide techniques and systems for performing accurate and full analysis of IC designs with a reasonable runtime. Specifically, some embodiments use a data model and on-disk representation that (1) stores the entire IC design as very large set of small objects instead of a single large addressable object, (2) combines individual objects, or parts of multiple objects, into a larger unit on which analysis can be efficiently performed, and (3) shares common parts of a single object between multiple computation units without requiring distributed coordination (like locks, waits or other shared consensus methods).

Advantages of embodiments described herein include, but are not limited to, (1) scaling computation and data access on an as-needed basis without causing starvation of resources (which include, but are not limited to, compute capacity, storage server capacity, and network capacity), and (2) significantly reducing the amount of time required to perform accurate and full analysis of IC designs.

In some embodiments, each individual compute unit may act on individual units of data that are most relevant for the compute unit. Some embodiments use an object data model that represents heterogenous types of data associated with an IC design, which may include, but is not limited to, IC design data and test vectors used for testing the IC design. Specifically, the heterogenous data may be represented as a set of variable sized sections. The data within each section may be location independent. In other words, references to data within each section and to other sections may be independent of the physical storage location of the section. In this manner, the links between data object may have referential integrity that is independent of how the data objects are stored in the system. During computation, multiple pieces of data may be combined as needed, possibly sourced from many individual units of data stored across a multi-level hierarchy of data storage devices, which may include, but are not limited to, caches, system memories, disks, and cloud storage.

Figure 1:
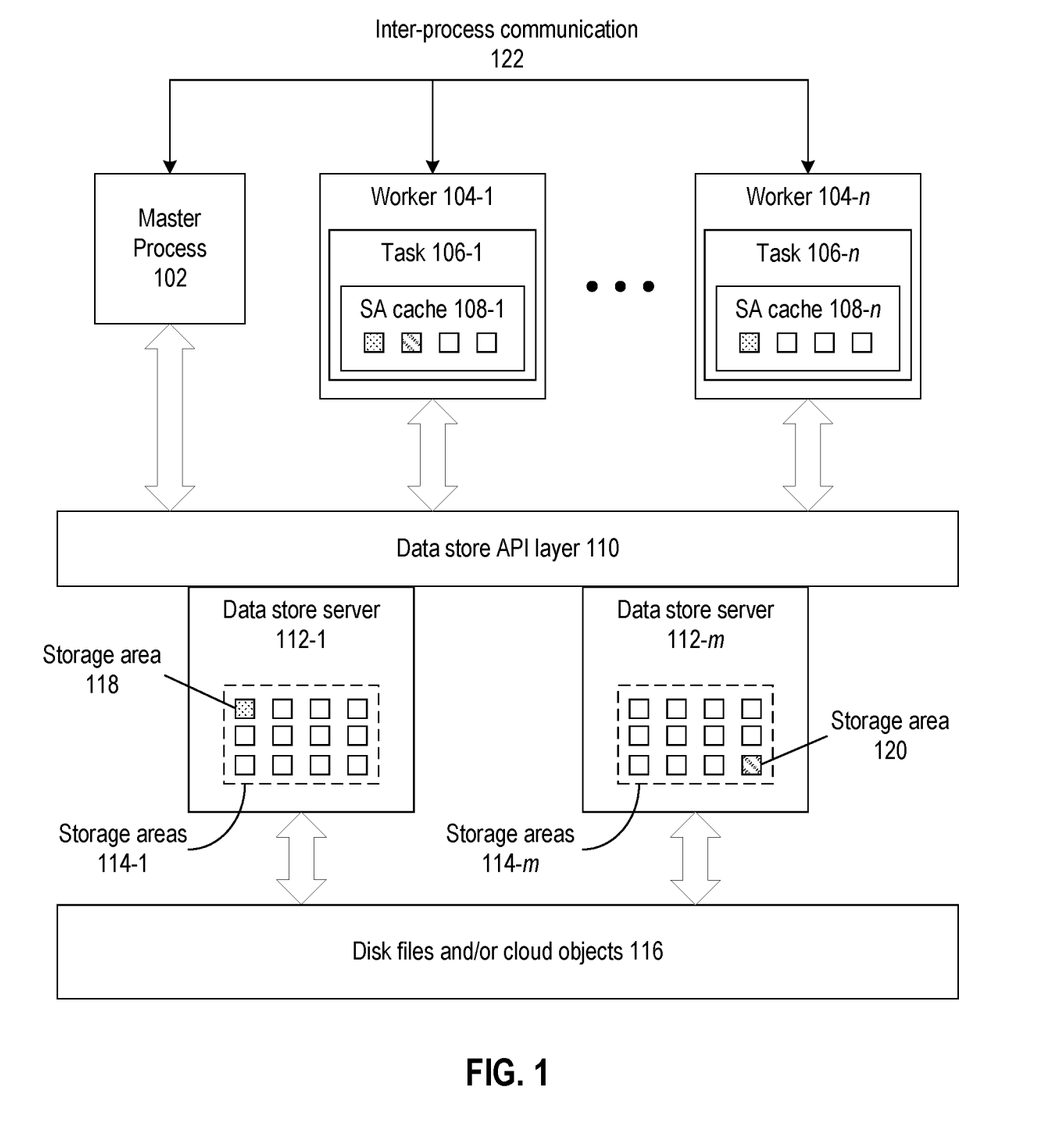
FIG. 1 illustrates a multi-level data hierarchy implemented on a distributed compute and data infrastructure in accordance with some embodiments described herein.

FIG. 1 illustrates a multi-level data hierarchy implemented on a distributed compute and data infrastructure in accordance with some embodiments described herein.

Processes on compute units (e.g., master process 102 and worker processes 104-1 through 104-n) may access (e.g., read and write) IC design data using data store API 110. A compute unit may generally be any machine capable of executing a set of instructions, which includes, but is not limited to, a processor in a multiprocessor system and a server in a distributed computing network. Master process 102 and worker processes 104-1 through 104-n may communicate with one another using inter-process communication mechanism 122. Each executing process may perform one or more tasks (e.g., worker process 104-1 may perform task 106-1 and worker process 104-n may perform task 106-n). Each task may maintain a storage area cache (e.g., task 106-1 may maintain storage area cache 108-1 and task 106-n may maintain storage area cache 108-n) that includes a set of storage areas on which the task operates. Some storage areas may be cached in multiple storage area caches, e.g., a copy of storage area 118 is cached in storage area caches 108-1 and 108-n. Some storage areas may be cached in only one cache, e.g., storage area 120 is cached in storage area cache 108-1 but is not cached in storage area cache 108-n.

Specifically, the IC design data may be stored on disk files and/or on cloud objects 116, and data store API 110 may represent the IC design data as a set of storage areas (e.g., set of storage areas 114-1 through 114-m). Data store servers 112-1 through 112-m may execute data access commands received through data store API 110. For example, upon receiving a "get storage area" command, a data store server may retrieve the requested storage area and provide the storage area to the task that executed the "get storage area" command. Likewise, upon receiving a "put storage area" command, a data store server may store the storage area that accompanied the "put storage area" command and provide an acknowledgement to the task that executed the "put storage area" command.

Each data store server (e.g., data store servers 112-1 through 112-m) may store a set of storage areas (e.g., set of storage areas 114-1 through 114-m) in memory. When a process or task (e.g., master process 102 and tasks in worker processes 104-1 through 104-n) performs a data access command on a particular storage area, the data access command may be routed to the appropriate data store server (e.g., data store servers 112-1 through 112-m) by data store API 110. For example, if a data access command is associated with storage area 118, then data store API 110 may route the data access command to data store server 112-1. On the other hand, if the data access command is associated with storage area 120, then data store API 110 may route the data access command to data store server 112-m.

Figure 2:
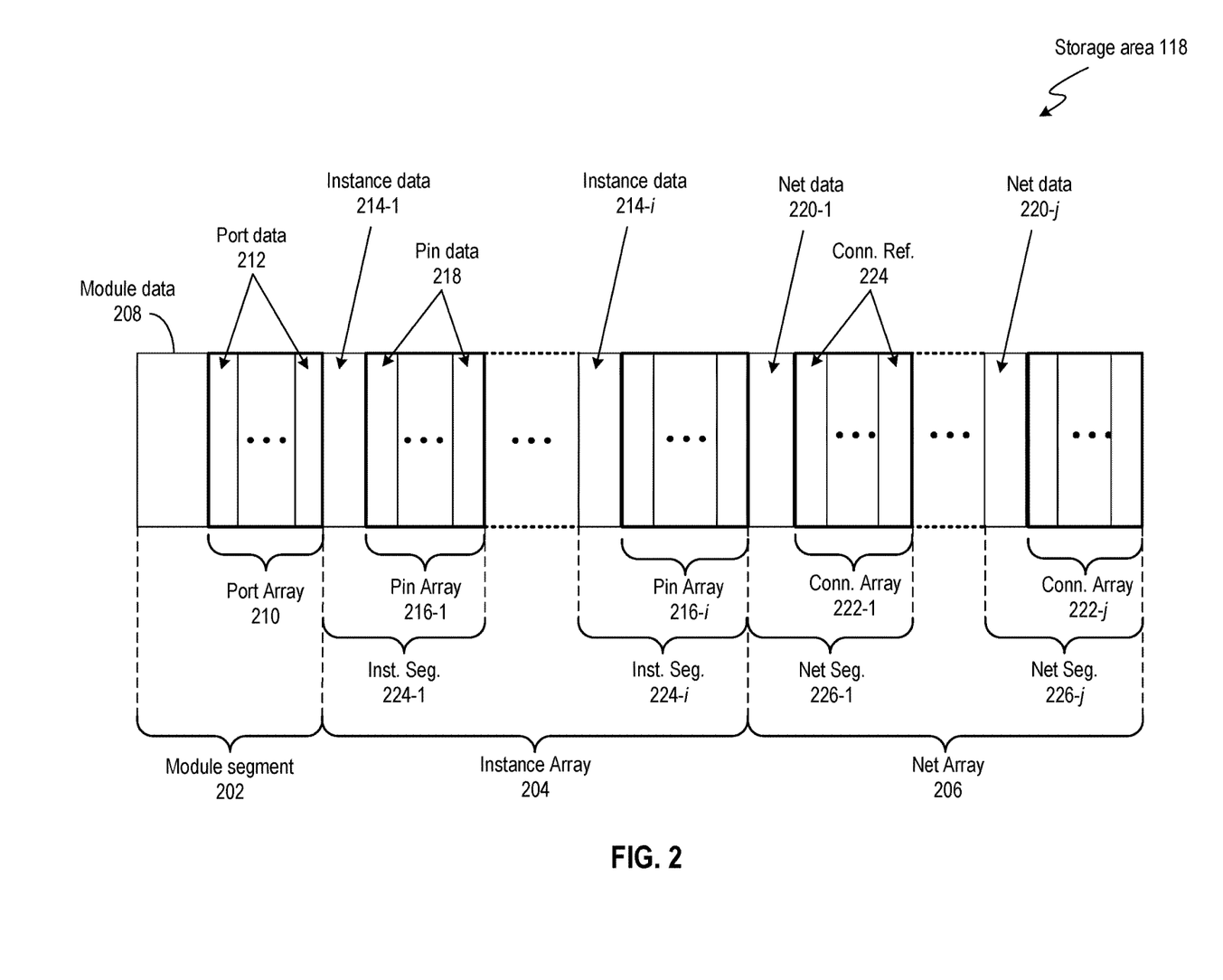
FIG. 2 illustrates a storage area in accordance with some embodiments described herein.

FIG. 2 illustrates a storage area in accordance with some embodiments described herein.

An IC design (e.g., an SoC design) may be represented by a hierarchy of modules, where each module may include (1) instantiations of gates, cells, or other modules, and (2) a set of wires or nets that interconnect the instantiations of gates, cells, or other modules. In some embodiments, each storage area may correspond to an IC design module. Specifically, an IC design (e.g., an SoC design) may be represented by a set of storage areas (e.g., set of storage areas 114-1 through 114-m), where each storage area (e.g., storage area 118) is a contiguous, variable-sized block of storage (e.g., a contiguous block of memory). The size of a storage area is determined by the set of IC design objects in the storage area. Representing the IC design as a set of storage areas that correspond to IC design modules enables applications (e.g., applications that perform power or timing analysis on an IC design) to access a desired set of IC design modules independently and on demand.

Specifically, a storage area (e.g., storage area 118 shown in FIG. 2) may include module segment 202, instance array 204, and net array 206. Module segment 202 may include module data area 208 and port array 210, which may include one or more port data areas 212.

Instance array 204 may include a set of instance segments (e.g., instance segments 224-1 through 224-i), where each instance segment may include an instance data area and a pin array. For example, instance array 204 may include i instance segments 224-1 through 224-i, where each instance segment includes a corresponding instance data area (instance data areas 214-1 through 214-i) and a pin array (pin arrays 216-1 through 216-i). Each pin array may include a set of pin data areas, e.g., pin array 216-1 includes pin data areas 218.

Net array 206 may include a set of net segments (e.g., net segments 226-1 through 226-j), where each net segment may include a net data area and a connection array. For example, net array 206 may include j net segments 226-1 through 226-j, where each net segment includes a corresponding net data area (net data areas 220-1 through 220-j) and a connection array (connection arrays 222-1 through 222-j). Each connection array may include a set of connection references, e.g., connection array 222-1 includes connection references 224.

Storage area 118 corresponds to a contiguous portion of storage, e.g., a contiguous block of memory that begins from a base memory address. The specific layout of storage area 118 shown in FIG. 2 is for illustration purposes only and is not intended to limit the scope of the disclosure to the forms disclosed. For example, module segment 202, instance array 204, and net array 206 may be arranged in a different order within a contiguous portion of memory. In this disclosure, the term "array" generally refers to a collection of elements and does not refer to a specific type of data structure. For example, the arrays illustrated in FIG. 2 may be implemented as linked lists whose elements are stored within a contiguous block of memory.

A storage area (e.g., storage area 118) may include scalar fields as well as references or locators to other IC design objects (e.g., modules, instances, or nets) within the same storage area or other storage areas. Specifically, references or locators to other data objects are specified using a format that is independent of where the storage area is mapped in the memory address space.

Figure 3:
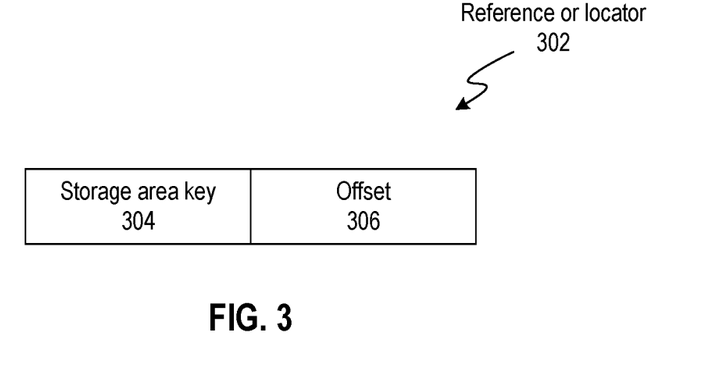
FIG. 3 illustrates a reference or locator in accordance with some embodiments described herein.

FIG. 3 illustrates a reference or locator in accordance with some embodiments described herein.

Reference or locator 302 may refer to an IC design object and include storage area key 304 and offset 306. Storage area key 304 uniquely identifies a storage area that includes the referenced IC design object and offset 306 provides an offset (e.g., a byte or word offset) from the beginning of the storage area where the referenced IC design object is located. The locator is independent with respect to the beginning memory address of a storage area in memory. In some embodiments, storage area key 304 may be an integer that stores a unique identifier associated with the storage area. In some embodiments, storage area key 304 may be used to retrieve or store the contents of a storage area into a database that can handle opaque key-value pairs of data. The memory address of the referenced data object may be calculated by adding offset 306 to the base memory address of the storage area.

Figure 4:
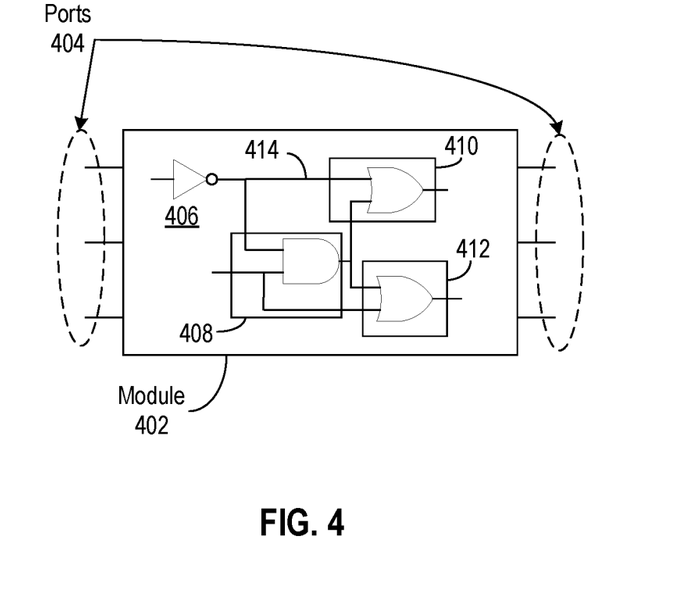
FIG. 4 illustrates a portion of an IC design corresponding to a storage area in accordance with some embodiments described herein.

FIG. 4 illustrates a portion of an IC design corresponding to a storage area in accordance with some embodiments described herein. Circuitry shown in FIG. 4 is for illustration purposes only and is not intended to limit the scope of the disclosure. Specifically, an IC design module typically includes many more modules, gates, and/or cells than those shown in FIG. 4.

A storage area, e.g., storage area 118, may store IC design data corresponding to module 402. Specifically, information corresponding to module 402 may be stored in module data area 208 shown in FIG. 2. The information stored in module data area 208 may include, but is not limited to, a unique identifier, a reference to a timing model, and/or a reference to a power model. Information corresponding to ports 404 may be stored in port array 210. Specifically, an instance data area in instance array 204 may store an identifier (e.g., a cell name) for inverter 406. Likewise, other instance data areas in instance array 204 may store references or locators for modules 408, 410, and 412. Pin arrays in instance array 204 may store identifiers for the pins of inverter 406 and modules 408, 410, and 412. The interconnections between inverter 406 and modules 408, 410, and 412 may be stored in net array 206. Specifically, the net data areas in net array 206 may store information (which may include, but is not limited to, metal layer and net length) corresponding to a particular net (e.g., net 414) in module 402. Connection arrays in net array 206 may store the connection references which specify the pins that are interconnected by the net. For example, net 414 interconnects the output of inverter 406 with inputs of modules 408 and 410. Thus, the connection array corresponding to net 414 may include the pin locator of the output of inverter 406 and the pin locators corresponding to the inputs of modules 408 and 410.

Storage areas may be independently created and stored or retrieved by compute units (e.g., each compute unit may correspond to a processor core) to perform one or more analysis tasks. The amount of storage consumed by storage areas within a single compute unit can be managed using a cache that can limit the amount of storage based on the resource capabilities of the compute unit or the dynamic load on the compute unit. Some embodiments may use a Least Recently Used (LRU) cache replacement policy to manage the storage areas that are stored within a storage area cache (e.g., storage area cache 108-1). Specifically, in LRU cache replacement, when the total amount of storage consumed by storage areas reaches a pre-determined threshold, the least recently used storage area is replaced by a new storage area.

The position independent locator mechanism as well as the fast cache provides a flexible storage system for managing IC design data. Specifically, embodiments disclosed herein facilitate permanent storage of data for fast checkpoint and restore functions, efficient interface to distributed disk or cloud data containers and/or databases, as well as efficient local storage management that allow resource limited compute units to be used to perform IC design analysis functions.

A particular analysis may use different parts of the IC design that may be in different storage areas. Some embodiments use a two-stage process to assemble the IC design data. Specifically, in the first stage, a set of storage areas that include the desired IC design objects for performing the analysis may be identified, and the IC design objects may be extracted from the set of storage areas. In the second stage, the IC design objects (which may be from different storage areas) may be combined, and the analysis task may then be performed using the combined result.

In some embodiments, disk accesses may be reduced by using an in-memory caching data layer to store all IC design objects that are being used across multiple analysis tasks. The in-memory data may be written to disk files and/or cloud objects 116 in FIG. 1 after the analysis tasks have been completed or a checkpoint is triggered.

Tasks (e.g., tasks 106-1 through 106-n in FIG. 1) may be scheduled using multiple worker processes (e.g., worker processes 106-1 through 106-n). Tasks may be scheduled in phases or batches on the worker processes once the data for performing the tasks is available. Tasks that do not have interdependencies may proceed independently of one another in parallel. Dependencies between tasks may be created if the data used by one task is generated by another task. In such cases, a dependency relationship may be built between the tasks and the tasks may be scheduled accordingly by a master process (e.g., master process 102).

In some embodiments, IC design objects may be stored using three storage layers: a fast-changing layer, a fast-sharing layer, and a distributed object storage layer. Movement of data between these three layers may be accomplished by coordinating the data readers/writers of these layers in parallel. The fast-changing layer may store data that is used by a given task. An example implementation of a fast-changing layer is storage area cache 108-1 which stores data used by task 106-1. Fast-sharing layer may store data that is used by multiple analysis tasks. An example implementation of a fast-sharing layer is the collection of storage areas 114-1 through 114-m which store data that is used by analysis tasks (e.g., tasks 106-1 through 106-n) across multiple compute units. Distributed object storage layer stores the entire IC design data. For example, disk files and/or cloud objects 116 is an example implementation of a distributed object storage layer.

In some embodiments, inter-process communication 122 may use an asynchronous notification mechanism to tie task and data dependencies and reduce the overhead of waiting. In other words, the data movement may be performed between the different storage layers and between different compute units only when the data is ready to be used or stored. In this manner, embodiments described herein eliminate bottlenecks and incompleteness problems that exist in traditional approaches. These above-described features create a scalable and distributed analysis system that lends itself naturally to cloud based deployments.

Figure 5:
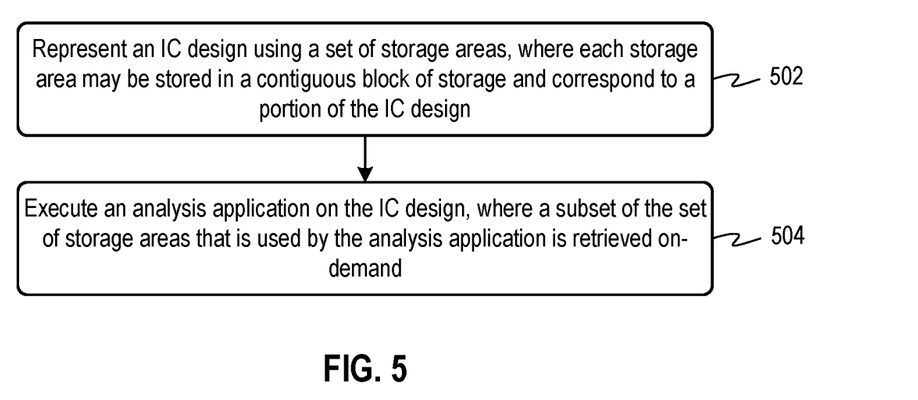
FIG. 5 illustrates a process for IC analysis using a multi-level data hierarchy implemented on a distributed compute and data infrastructure in accordance with some embodiments described herein.

FIG. 5 illustrates a process for IC analysis using a multi-level data hierarchy implemented on a distributed compute and data infrastructure in accordance with some embodiments described herein.

The process may begin by representing an IC design using a set of storage areas, where each storage area may be stored in a contiguous block of storage and correspond to a portion of the IC design (at 502). For example, an IC design may be represented using storage areas 114-1 through 114-m (shown in FIG. 1), where each storage area may be stored in a contiguous block of storage and represent a module, e.g., module 402 (shown in FIG. 4).

Specifically, each storage area of the set of storage areas may include a module segment (e.g., module segment 202 in FIG. 2), an instance array (e.g., instance array 204), and a net array (e.g., net array 206). The module segment may include a module data area (e.g., module data area 208) and a port array (e.g., port array 210). The instance array may include one or more instance segments, where each instance segment may include an instance data area (e.g., instance data area 214-1) and a pin array (e.g., pin array 216-1). The net array may include one or more net segments, where each net segment may include a net data area (e.g., net data area 220-1) and a connection array (e.g., connection array 222-1).

The process may then execute an analysis application on the IC design, where a subset of the set of storage areas that is used by the analysis application is retrieved on-demand (at 504). Examples of analysis applications may include, but are not limited to, an application to perform an accurate analysis of peak power consumption of the IC design and an application to generate a signal waveform based on simulating the IC design. In some embodiments, executing the analysis application may include executing a plurality of analysis tasks in parallel using a plurality of compute units (e.g., executing tasks 106-1 through 106-n in parallel).

In some embodiments, each compute unit may include a cache of storage areas (e.g., storage area caches 108-1 through 108-n). The term "on-demand" refers to retrieving storage areas as and when required by an analysis application or task. For example, in some embodiments, if an analysis application or task uses a total of 100 storage areas, then these 100 storage areas may not be pre-loaded into memory before the analysis application or task begins execution. Instead, each storage area may be retrieved when the storage area is needed by the analysis application or task for performing calculations. Specifically, the first time the storage area is accessed by the analysis application or task, a data store server (e.g., data store servers 112-1) may retrieve the storage area from disk files and/or cloud objects 116 and store a copy of the storage area in memory (e.g., in storage areas 114-1). A copy of the storage area may also be provided to a storage area cache (e.g., storage area cache 108-1) of the compute unit that is executing the analysis application or task that requested the storage area.

In some embodiments, the plurality of analysis tasks may access the set of storage areas using a data store API layer (e.g., data store API layer 110) which enables in-memory sharing of storage areas across the plurality of analysis tasks (e.g., storage areas 114-1 through 114-m are stored in-memory and are shared between tasks 106-1 through 106-n). In some embodiments, storage areas of the subset of the set of storage areas are written to disk or cloud storage (e.g., disk files and/or cloud objects 116) when the plurality of analysis tasks complete, or a checkpoint is triggered.

In some embodiments, the plurality of analysis tasks communicate with one another using an asynchronous notification mechanism (e.g., inter-process communication 122). Specifically, a master process (e.g., master process 102) may perform the following sequence of operations: (1) open a session using the asynchronous notification mechanism, (2) publish a data event using the session, (3) close the session, and (4) perform other commands. A worker process (e.g., worker processes 104-1 through 104-n) may perform the following sequence of operations: (1) subscribe to a data event using the asynchronous notification mechanism, (2) receive a notification of the data event (which was published by the master process), (3) retrieve the data associated with the data event, and (4) perform computations on the data and referenced storage areas.

Figure 6:
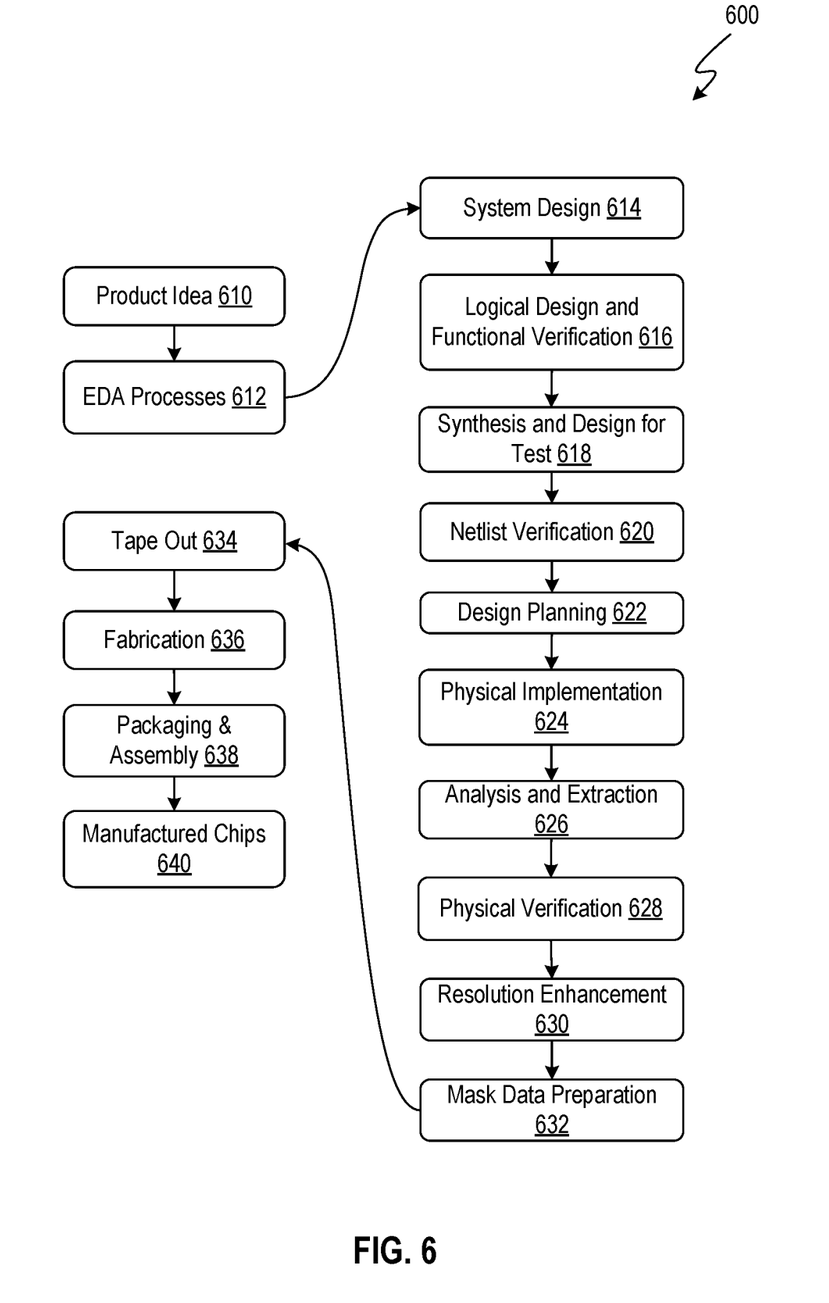
FIG. 6 illustrates an example flow for the design, verification, and fabrication of an integrated circuit in accordance with some embodiments described herein.

FIG. 6 illustrates an example flow 600 for the design, verification, and fabrication of an integrated circuit in accordance with some embodiments described herein. EDA processes 612 (the acronym "EDA" refers to "Electronic Design Automation") can be used to transform and verify design data and instructions that represent the integrated circuit. Each of these processes can be structured and enabled as multiple modules or operations.

Flow 600 can start with the creation of a product idea 610 with information supplied by a designer, information which is transformed and verified by using EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly 638 are performed to produce the manufactured IC chip 640.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more detailed description adds more detail into the design description. The lower levels of representation that are more detailed descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as "emulators" or "prototyping systems" are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
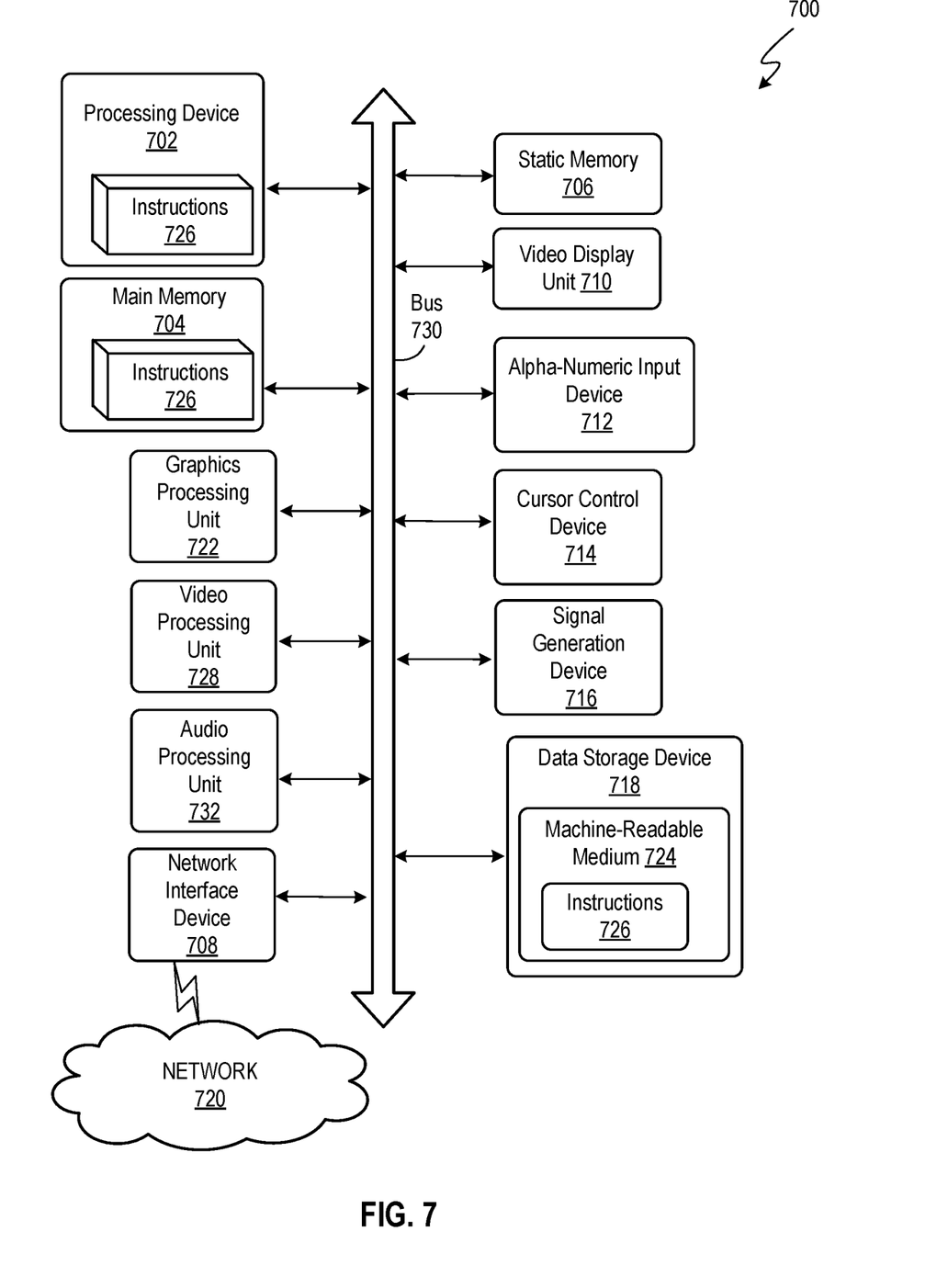
FIG. 7 illustrates an example machine of a computer system within which a set of instructions, for causing the machine to perform any one or more of the methodologies discussed herein, may be executed in accordance with some embodiments disclosed herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    representing an integrated circuit (IC) design using a set of storage areas, wherein each storage area is stored in a contiguous block of storage and corresponds to a portion of the IC design, and wherein each storage area of the set of storage areas comprises a module segment, an instance array, and a net array;
    providing an application programming interface (API) layer to an analysis application, wherein the API layer enables the analysis application to access individual storage areas; and
    executing, by one or more processors, the analysis application on the IC design, wherein a subset of the set of storage areas that is used by the analysis application is retrieved on-demand using the API layer.

2. The method of claim 1, wherein the module segment comprises a module data area and a port array, wherein the instance array comprises one or more instance segments, each instance segment comprising an instance data area and a pin array, and wherein the net array comprises one or more net segments, each net segment comprising a net data area and a connection array.

3. The method of claim 1, wherein the executing the analysis application comprises executing a plurality of analysis tasks in parallel using a plurality of compute units.

4. The method of claim 3, wherein each compute unit includes a cache of storage areas.

5. The method of claim 3, wherein the plurality of analysis tasks accesses the set of storage areas using the API layer which enables in-memory sharing of storage areas across the plurality of analysis tasks.

6. The method of claim 5, wherein the subset of the set of storage areas is written to disk or cloud storage when the plurality of analysis tasks completes or a checkpoint is triggered.

7. The method of claim 3, wherein the plurality of analysis tasks communicate with one another using an asynchronous notification mechanism.

8. A system, comprising:
    a memory storing instructions; and a processor, coupled with the memory and to execute the instructions, the instructions when executed cause the processor to:

represent an integrated circuit (IC) design using a set of storage areas, wherein each storage area is stored in a contiguous block of storage and corresponds to a portion of the IC design, wherein each storage area of the set of storage areas comprises a module segment, an instance array, and a net array;

providing an application programming interface (API) layer to an analysis application, wherein the API layer enables the analysis application to access individual storage areas; and execute an analysis application on the IC design, wherein a subset of the set of storage areas that is used by the analysis application is retrieved on-demand using the API layer.

9. The system of claim 8, wherein the module segment comprises a module data area and a port array, wherein the instance array comprises one or more instance segments, each instance segment comprising an instance data area and a pin array, and wherein the net array comprises one or more net segments, each net segment comprising a net data area and a connection array.

10. The system of claim 8, wherein the executing the analysis application comprises executing a plurality of analysis tasks in parallel using a plurality of compute units.

11. The system of claim 10, wherein each compute unit includes a cache of storage areas.

12. The system of claim 10, wherein the plurality of analysis tasks accesses the set of storage areas using the API layer which enables in-memory sharing of storage areas across the plurality of analysis tasks.

13. The system of claim 12, wherein the subset of the set of storage areas is written to disk or cloud storage when the plurality of analysis tasks completes or a checkpoint is triggered.

14. The system of claim 10, wherein the plurality of analysis tasks communicate with one another using an asynchronous notification mechanism.

15. A non-transitory computer-readable medium comprising stored instructions, which when executed by a processor, cause the processor to:

represent an integrated circuit (IC) design using a set of storage areas, wherein each storage area is stored in a contiguous block of storage and corresponds to a portion of the IC design, and wherein each storage area of the set of storage areas comprises a module segment, an instance array, and a net array;

providing an application programming interface (API) layer to an analysis application, wherein the API layer enables the analysis application to access individual storage areas; and execute an analysis application on the IC design, wherein a subset of the set of storage areas that is used by the analysis application is retrieved on-demand using the API layer.

16. The non-transitory computer-readable medium of claim 15, wherein the module segment comprises a module data area and a port array, wherein the instance array comprises one or more instance segments, each instance segment comprising an instance data area and a pin array, and wherein the net array comprises one or more net segments, each net segment comprising a net data area and a connection array.

17. The non-transitory computer-readable medium of claim 15, wherein the executing the analysis application comprises executing a plurality of analysis tasks in parallel using a plurality of compute units.

* * * * *

UNITED STATES PATENT AND TRADEMARK OFFICE
CERTIFICATE OF CORRECTION

PATENT NO. : 11,630,934 B1
APPLICATION NO. : 17/175268
DATED : April 18, 2023
INVENTOR(S) : Jayanta Roy et al.

It is certified that error appears in the above-identified patent and that said Letters Patent is hereby corrected as shown below:

On the Title Page

Item (72) (In the inventors), please delete the fourth inventor's first name, "Arney" and replace with the name --Amey--.

Signed and Sealed this
Twenty-fifth Day of July, 2023

Katherine Kelly Vidal
*Director of the United States Patent and Trademark Office*